United States Patent
Mysen et al.

(10) Patent No.: US 10,902,495 B2
(45) Date of Patent: Jan. 26, 2021

(54) PRESENTING SEARCH RESULTS IN A DYNAMICALLY FORMATTED GRAPHICAL USER INTERFACE

(71) Applicant: Google LLC, Mountain View, CA (US)

(72) Inventors: Clarence Christopher Mysen, San Francisco, CA (US); Jennifer Liu, Cupertino, CA (US)

(73) Assignee: Google LLC, Mountain View, CA (US)

( * ) Notice: Subject to any disclaimer, the term of this patent is extended or adjusted under 35 U.S.C. 154(b) by 171 days.

(21) Appl. No.: 15/474,468

(22) Filed: Mar. 30, 2017

(65) Prior Publication Data

US 2018/0285953 A1 Oct. 4, 2018

Related U.S. Application Data

(63) Continuation of application No. 13/179,055, filed on Jul. 8, 2011, now abandoned.

(51) Int. Cl.
*G06Q 30/06* (2012.01)
*G06Q 30/02* (2012.01)
*G06F 3/0482* (2013.01)
*G06F 16/9535* (2019.01)
*G06F 3/0483* (2013.01)
(Continued)

(52) U.S. Cl.
CPC ....... *G06Q 30/0625* (2013.01); *G06F 3/0482* (2013.01); *G06F 3/0483* (2013.01); *G06F 16/9535* (2019.01); *G06F 40/106* (2020.01); *G06F 40/186* (2020.01); *G06Q 30/0256* (2013.01); *G06Q 30/0641* (2013.01)

(58) Field of Classification Search
CPC ........... G06Q 30/0625; G06Q 30/0256; G06Q 30/0641; G06F 16/9535; G06F 3/0482; G06F 17/212; G06F 17/248
USPC .......................................................... 707/708
See application file for complete search history.

(56) References Cited

U.S. PATENT DOCUMENTS

| 6,134,532 | A | 10/2000 | Lazarus et al. |
| 2003/0037041 | A1 | 2/2003 | Hertz |
| 2007/0244750 | A1 | 10/2007 | Grannan et al. |

(Continued)

FOREIGN PATENT DOCUMENTS

WO 2004/111771 A2 12/2004

OTHER PUBLICATIONS

Van Bramer, "U.S. Office Action issued in copending U.S. Appl. No. 13/179,104, filed Jul. 8, 2011", dated Nov. 20, 2017, 23 pages.

(Continued)

*Primary Examiner* — Alicia M Antoine
(74) *Attorney, Agent, or Firm* — Dority & Manning, P.A.

(57) ABSTRACT

A content provider can provide content, such as advertisements or other promotional material, to a recipient. A distribution system of the content provider can receive a query and select one or more advertisements and a user interface for presenting the advertisements based on the query, information associated with the user, a set of queries received from the user, and/or other information. A model for selecting the user interface can be generated by serving available user interfaces randomly or pseudo-randomly and monitoring user interaction with the served user interfaces. The model can be updated during regular use based on the performance of the user interfaces.

20 Claims, 6 Drawing Sheets

(51) Int. Cl.
*G06F 40/106* (2020.01)
*G06F 40/186* (2020.01)

(56) References Cited

U.S. PATENT DOCUMENTS

| | | | |
|---|---|---|---|
| 2008/0133336 A1 | 6/2008 | Altman et al. | |
| 2008/0228600 A1 | 9/2008 | Treyz et al. | |
| 2009/0024476 A1 | 1/2009 | Baar et al. | |
| 2009/0077056 A1* | 3/2009 | Ravikumar | G06F 16/9535 |
| 2009/0241018 A1* | 9/2009 | Costello | G06F 16/9535 |
| | | | 715/227 |
| 2010/0094878 A1* | 4/2010 | Soroca | G06F 17/30035 |
| | | | 707/748 |
| 2011/0055008 A1 | 3/2011 | Feuerstein et al. | |
| 2011/0137818 A1 | 6/2011 | Goad et al. | |
| 2011/0173059 A1 | 7/2011 | Benson | |
| 2012/0095837 A1 | 4/2012 | Bharat et al. | |
| 2012/0245990 A1 | 9/2012 | Agarwal | |
| 2015/0019958 A1* | 1/2015 | Ying | G06F 17/211 |
| | | | 715/243 |

OTHER PUBLICATIONS

Van Bramer, "U.S. Office Action issued in copending U.S. Appl. No. 14/456,537, filed Aug. 11, 2014", dated Nov. 16, 2017, 22 pages.
Van Bramer, "U.S. Office Action issued in copending U.S. Appl. No. 13/178,917, filed Jul. 8, 2011", dated Aug. 28, 2013, 11 pages.
Van Bramer, "U.S. Office Action issued in copending U.S. Appl. No. 13/178,917, filed Jul. 8, 2011", dated Apr. 9, 2014, 13 pages.
Van Bramer, "U.S. Office Action issued in copending U.S. Appl. No. 13/179,055, filed Jul. 8, 2011", dated Jan. 28, 2015, 10 pages.
Van Bramer, "U.S. Office Action issued in copending U.S. Appl. No. 13/179,055, filed Jul. 8, 2011", dated Aug. 26, 2015, 13 pages.
Van Bramer, "U.S. Office Action issued in copending U.S. Appl. No. 13/179,055, filed Jul. 8, 2011", dated Jun. 24, 2016, 17 pages.
Van Bramer, "U.S. Office Action issued in copending U.S. Appl. No. 13/179,075, filed Jul. 8, 2011", dated Dec. 19, 2014, 12 pages.
Van Bramer, "U.S. Office Action issued in copending U.S. Appl. No. 13/179,075, filed Jul. 8, 2011", dated Jun. 1, 2015, 20 pages.
Van Bramer, "U.S. Office Action issued in copending U.S. Appl. No. 13/179,104, filed Jul. 8, 2011", dated Dec. 8, 2014, 14 pages.
Van Bramer, "U.S. Office Action issued in copending U.S. Appl. No. 13/179,104, filed Jul. 8, 2011", dated May 5, 2015, 16 pages.
Van Bramer, "U.S. Office Action issued in copending U.S. Appl. No. 13/179,104, filed Jul. 8, 2011", dated Apr. 6, 2016, 17 pages.
Van Bramer, "U.S. Office Action issued in copending U.S. Appl. No. 13/179,104, filed Jul. 8, 2011", dated Oct. 6, 2016, 22 pages.
Van Gramer, "U.S. Office Action issued in copending U.S. Appl. No. 14/456,537, filed Aug. 11, 2014", dated Dec. 28, 2016, 21 pages.
Van Bramer, "U.S. Office Action issued in copending U.S. Appl. No. 13/179,104, filed Jul. 8, 2011" dated May 3, 2017, 20 pages.
Van Bramer, "U.S. Office Action issued in copending U.S. Appl. No. 14/456,537, filed Aug. 11, 2014", dated May 15, 2017, 20 pages.
Van Bramer, "U.S. Office Action issued in copending U.S. Appl. No. 13/179,104, filed Jul. 8, 2011", dated Jul. 11, 2018, 23 pages.
Van Bramer "U.S. Office Action issued in copending U.S. Appl. No. 13/179,104, filed Jul. 8, 2011", dated Jan. 29, 2019, 14 pages.
Van Bramer "U.S. Office Action issued in copending U.S. Appl. No. 13/179,104, filed Jul. 8, 2011", dated May 29, 2019, 9 pages.

* cited by examiner

PRESENTING SEARCH RESULTS IN A DYNAMICALLY FORMATTED GRAPHICAL USER INTERFACE

CROSS REFERENCE TO RELATED APPLICATION

This application is a continuation of and claims priority to U.S. patent application Ser. No. 13/179,055 filed Jul. 8, 2011, and entitled "Selecting User Interface for Presenting Content." The complete disclosure of the above-identified priority application is hereby fully incorporated herein by reference.

TECHNICAL FIELD

The present disclosure relates generally to dynamic graphical user interface formats for presenting selected search results.

BACKGROUND

Computer networks, such as the Internet, enable transmission and reception of a vast array of information. In recent years, for example, some service provider systems have attempted to make product information available to clients over the Internet. It is becoming increasingly popular for information providers to provide mechanisms by which users can search for and compare item information across multiple providers. For example, Internet sites allow users to search for and compare information for items across multiple providers.

Some Internet sites also provide additional content to assist users in learning more about the items and service providers that the user is researching. To better help users with this process, conventional rich formats associated with the additional content often present a myriad of information, such as images, descriptive information, and an item rating. Such information typically is presented in a standard format as provided in the web page, where additional content placed in the same format into the web page each time. Additionally, additional content can take up valuable space and attention on a search page or another type of web page presenting the additional content. Thus, being frugal and directed about what information to present may be difficult.

Users researching an item may be at different stages in their research process and desire different information depending on the stage at which they are in the search process. For example, a user that has been researching a particular pair of shoes may desire pricing and promotional information for that particular pair of shoes, while a user searching for a general type of shoe may desire images and product rating information on a multitude of shoes. Therefore, it is desirable to provide relevant content as well as relevant types of content in a format that is desirable to the user.

SUMMARY

In certain exemplary embodiments, a method for providing search results includes receiving a query at a computer. The computer selects one or more search results for transmission in response to the query. The computer selects a user interface for presenting the one or more selected search results. The user interface is selected from available user interfaces based upon information contained in the query. The computer transmits information regarding the one or more selected search results and information regarding the selected user interface.

In certain exemplary embodiments, a system for providing content includes a receiver that can receive a request for search results. A content module selects content for transmission in response to the request. A user interface selection module selects a user interface for presenting the selected content. The user interface is selected from available user interfaces based upon information contained in the request. A communication module transmits information regarding the one or more selected content and information regarding the selected user interface.

These and other aspects, objects, features, and advantages of the exemplary embodiments will become apparent to those having ordinary skill in the art upon consideration of the following detailed description of illustrated exemplary embodiments, which include the best mode of carrying out the invention as presently perceived.

DETAILED DESCRIPTION OF EXEMPLARY EMBODIMENTS

Overview

Figure 1:
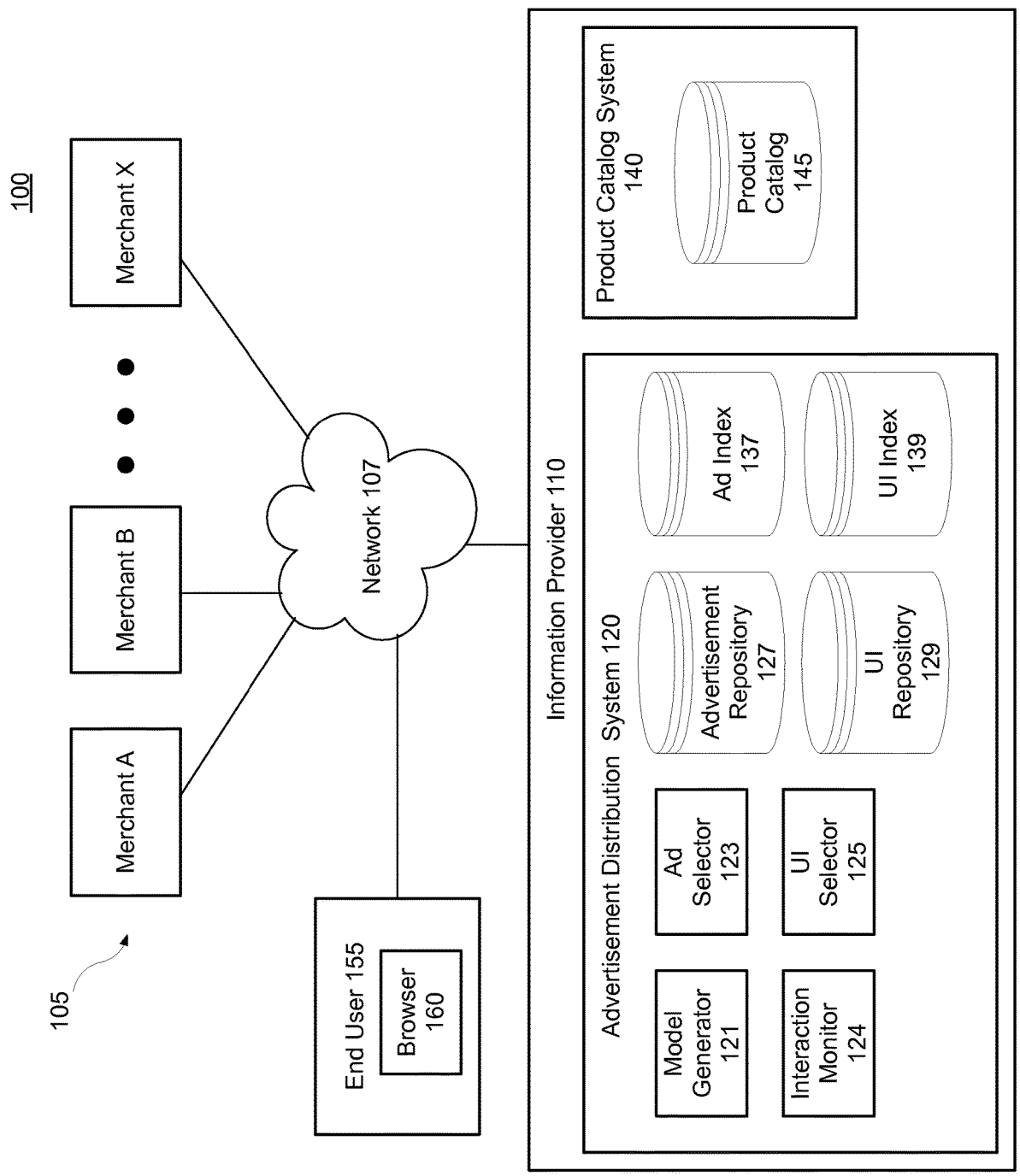
FIG. 1 depicts a system for providing content, in accordance with certain exemplary embodiments.

The methods and systems described herein enable a content provider to serve advertisements or other content to a recipient in a context or query relevant way. To contend with the varying requirements or desires of each query or each user, the methods and systems described herein select and present different user interface variations to users based on certain information, such as information obtained from one or more queries, and/or information associated with the user, such as demographic information, past query information, and/or past interaction with advertisements. Performance information for the user interfaces in relation to specific queries and in relation to particular individuals can be logged and used to improve the performance of the user interface selection.

An exemplary system includes a product catalog system and an advertisement distribution system, each implemented in hardware and/or software. The product catalog system provides product information to a recipient in response to a request, for example, in response to a search query. The product catalog system receives information regarding products from multiple merchants and stores the received information in a product catalog. Generally, this information includes, for each product, a title, a description, one or more images, a price, a product category, and a product identifier, such as a global trade item number ("GTIN"), an international standard book number ("ISBN"), a universal product code ("UPC"), a European article number ("EAN"), a stockkeeping unit ("SKU"), or other suitable identifier. As used throughout this specification, the term "product" should be interpreted to include tangible and intangible products, as well as services. For simplicity, manufacturers, retailers, and others that sell products or services to customers are interchangeably referred to herein as "merchants."

The advertisement distribution system provides advertisements or other content selections to the recipient. In one embodiment, the content can be selected based in whole or in part on a search query received from the recipient. The advertisement distribution system also selects a user interface, template, or presentation format for presenting the advertisement to the recipient based on the search query and/or other information, such as one or more previous search queries received from the recipient, previous advertisement selections received from the recipient, demographic information of the recipient, performance information of the user interface for a query or for the recipient, information regarding the products subject to the advertisements, such as price, product type, brand and information, and/or types of content available for the advertisements, such as images, videos, discount information, sales information, or product review information. The advertisements also can be selected based on information regarding search results, such as other advertisements sent to the recipient, information regarding the web sites included with the search results, and information regarding the query or query session, such as query category, broadness of the query, related queries, and keywords associated with the query. For example, the advertisement distribution system may serve several advertisements to a recipient in a user interface having images for products only, in response to the recipient searching based on product style or appearance. In another example, the advertisement distribution system may serve several advertisements to a recipient in the form of a list of relevant products and their corresponding prices in response to the recipient submitting a specific query. In another example, the advertisement distribution system may serve one or more advertisements in a first format and one or more additional advertisements in a second format, different than the first format.

The advertisement distribution system also may select and/or change the content of advertisements based on the abovementioned information or based on user interaction with the advertisements. For example, the advertisement distribution system may remove images from displayed advertisement in response to a user selection an advertisement that does not include images or in response to the user refining a search query to a search query whereby images are not relevant.

Users may be allowed to limit or otherwise affect the operation of the features disclosed in the specification. For example, users may be given opportunities to opt-in or opt-out of the collection or use of certain data or the activation of certain features. In addition, users may be given the opportunity to change the manner in which the features are employed, including for situations in which users may have concerns regarding their privacy. Instructions also may be provided to users to notify them regarding policies about the use of information, including personally identifiable information, and manners in which they may affect such use of information. Thus, sensitive personal information can be used to benefit a user, if desired, through receipt of advertisements or other information relevant to the user, without risking disclosure of personal information or the user's identity.

One or more aspects of the exemplary embodiments may include a computer program that embodies the functions described and illustrated herein, wherein the computer program is implemented in a computer system that comprises instructions stored in a machine-readable medium and a processor that executes the instructions. However, it should be apparent that there could be many different ways of implementing the exemplary embodiments in computer programming, and the exemplary embodiments should not be construed as limited to anyone set of computer program instructions. Further, a skilled programmer would be able to write such a computer program to implement an embodiment based on the appended flow charts and associated description in the application text. Therefore, disclosure of a particular set of program code instructions is not considered necessary for an adequate understanding of how to make and use the exemplary embodiments. The functionality of the exemplary embodiments will be explained in more detail in the following description, read in conjunction with the figures illustrating the program flow.

Turning now to the drawings, in which like numerals indicate like (but not necessarily identical) elements throughout the figures, exemplary embodiments are described in detail.

System Architecture

With reference to FIG. 1, a system 100 for providing content can be used to provide content to an individual. As depicted in FIG. 1, the system 100 includes network devices 105, 110, and 155 that are configured to communicate with one another via one or more networks 107. Each network 107 includes a wired or wireless telecommunication means by which network devices (including devices 105, 110, 155) can exchange data. For example, each network 107 can include a local area network ("LAN"), a wide area network ("WAN"), an intranet, an Internet, a mobile telephone network, or any combination thereof. Throughout the discussion of exemplary embodiments, it should be understood that the terms "data" and "information" are used interchangeably herein to refer to text, images, audio, video, or any other form of information that can exist in a computer-based environment.

Each network device 105, 110, 155 includes a device having a communication module capable of transmitting and receiving data over the network 107. For example, each network device 105, 110, 155 can include a server, desktop computer, laptop computer, tablet computer, smartphone, handheld computer, personal digital assistant ("PDA"), or any other wired or wireless, processor-driven device. In the exemplary embodiment depicted in FIG. 1, the network devices 105, 110, 155 are operated by merchants, an information provider, and an end user customer, respectively The end user network devices 155 each include a browser application module 160, such as Microsoft Internet Explorer, Firefox, Netscape, Google Chrome, or another suitable application for interacting with web page files maintained by the information provider network device 110 and/or other network devices. The web page files can include text, graphics, images, sound, video, and other multimedia or data files that can be transmitted via the network 107. For example, the web page files can include one or more files in the Hypertext Markup Language ("HTML"). The browser application module 160 can receive web page files from the information provider network device 110 and can display web page files to an end user operating the end user network device 155. In certain exemplary embodiments, the web page files include information from a product catalog 145, which is maintained by a product catalog system 140. In certain exemplary embodiments, the web page files include one or more advertisements or other content from an advertisement repository 127, maintained by an advertisement distribution system 120. The advertisement distribution system 120 and the product catalog system 140 are described in more detail hereinafter with reference to the method depicted in FIG. 2.

System Process

Figure 2:
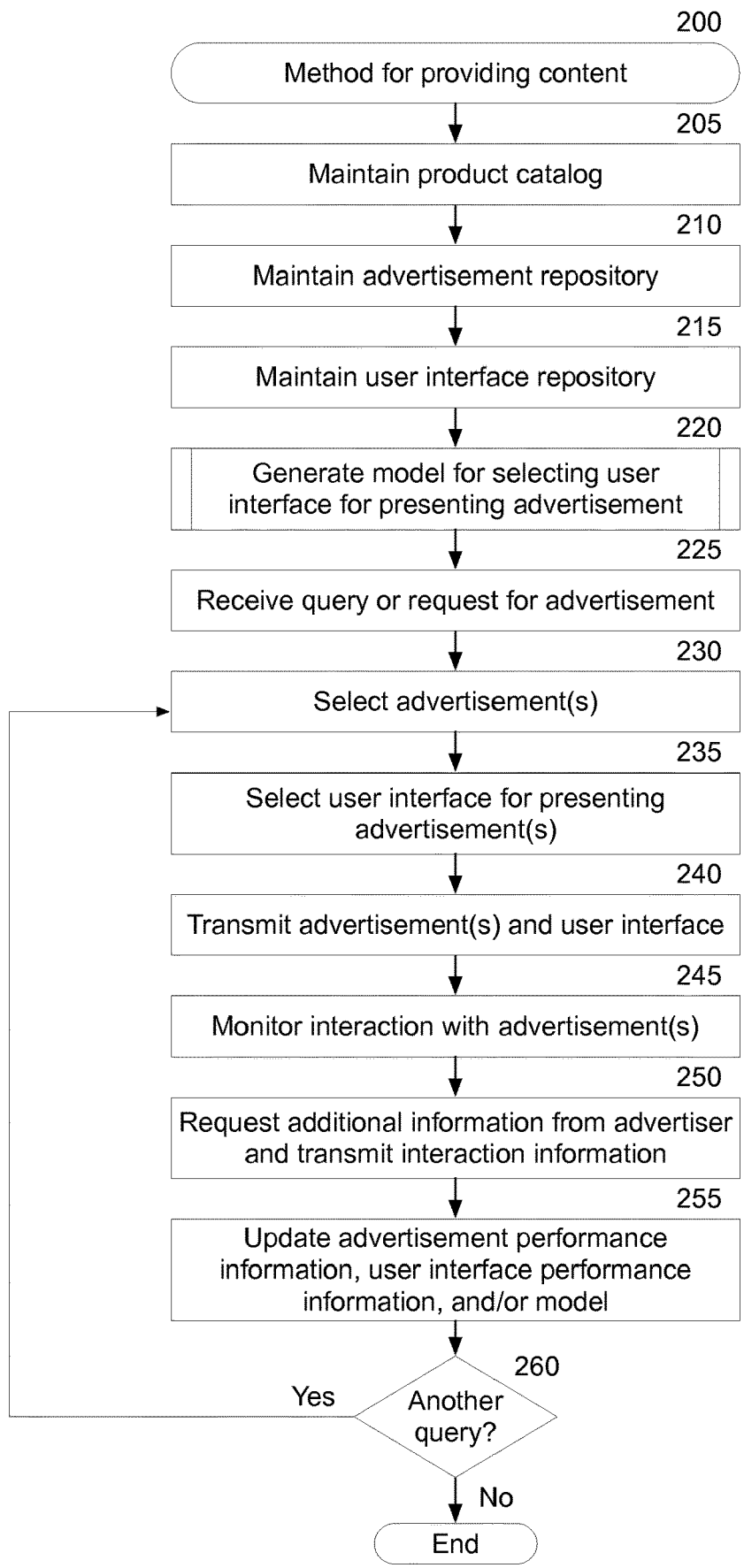
FIG. 2 is a block flow diagram depicting a method for providing content, in accordance with certain exemplary embodiments.

FIG. 2 is a block flow diagram depicting a method 200 for providing content, in accordance with certain exemplary embodiments. The method 200 is described with reference to the components illustrated in FIG. 1.

In block 205, the product catalog system maintains the product catalog 145. The product catalog includes a data structure, such as one or more databases and/or electronic records, that includes information regarding products from at least one merchant 105. For each product, the information in the product catalog 145 can include, for example, a title, a description, one or more images, a price, a product category, a product identifier, such as a GTIN, an ISBN, a UPC, an EAN, an SKU, or other suitable identifier, product reviews, and/or any other suitable information associated with a product.

In certain exemplary embodiments, a receiver module (not shown) of the product catalog system 140 receives information that is included in the product catalog 145 in electronic feeds and/or hard copy provided by one or more merchants 105 and/or another information source, such as a specialized information aggregator. For example, each merchant 105 and/or another information source may periodically provide batched or unbatched product data in an electronic feed to the receiver module. The receiver module also may receive product information from scanned product documentation and/or catalogs. In certain exemplary embodiments, the receiver module may receive product data from a screen scraping mechanism, which is included in or associated with the product catalog system 140. For example, the screen scraping mechanism may capture product information from merchant and/or information provider web sites. In certain exemplary embodiments, end users may view information from the product catalog via browsers 160 on their respective end user network devices 155. In certain exemplary embodiments, end users may search for products, merchants, or information related to products by submitting a query to the product catalog via the browsers 160.

In block 210, the advertisement distribution system 120 maintains the advertisement repository 127. Similar to the product catalog 145, the advertisement repository 127 includes a data structure, such as one or more databases and/or one or more electronic records, that includes advertisements. Alternatively, the advertisements are maintained by the respective advertisers, such as the merchants 105. The advertisements can include text, images, audio, video creatives, or any other form of information that can exist in a computer based environment. The advertisements can include any type of content, including coupons, discounts, offers, product ratings, product reviews, pricing information, inventory or availability of a product, product category information, and merchant location information, to name a few examples.

In block 215, the advertisement distribution system 120 maintains the user interface repository 129. The user interface repository 129 includes a data structure, such as one or more databases and/or one or more electronic records, that includes user interfaces, templates, or formats for displaying one or more advertisements or information regarding one or more advertisements. Generally, each user interface defines what information of the advertisements to provide to a recipient and how that information is presented. Each user interface can present one or more of images, videos, audio, text, product title, product description, product ratings or reviews, inventory or availability, promotional offers, discounts, coupons, merchant location information, options to "see more from the advertiser," links to further search refinements, and any other suitable information included in the advertisements. Each user interface may include a template for presenting content and the template may be populated with information regarding one or more advertisements when presented to an individual. For example, some user interfaces may include a template for displaying several advertisements, each displayed advertisement including one or more product images, while certain other user interfaces may include a template for displaying several advertisements, each displayed advertisement including a product title, product description, and product rating information.

In certain exemplary embodiments, each user interface or template also defines the number of advertisements and the way in which the advertisements are displayed by the end user network device 155. For example, a user interface may display three advertisements on the right side or bottom of a web page document that contains other content.

One exemplary user interface displays images of products only, without any text or other forms of content, or with a small portion of other content only. An individual searching for products based on style or appearance may prefer to view images of products rather than information related to product pricing, description, or ratings. For example, an individual that submits a search query for "red sports car" may prefer to view images of relevant cars in advertisements rather than viewing advertisements having a description of particular cars and promotional information. A user interface may display this information in a format that provides the desired information.

Another user interface displays information regarding multiple products, without displaying any images. An individual may prefer to view detailed information regarding products or pricing or discount information while not being interested in images of the product. For example, an individual searching for a specific product, such as an "oil filter for 2001 Toyota Tundra" may not desire to see images. Instead, such an individual may desire to view prices and availability information at a multitude of merchants in the area of the individual. A user interface may display this information in a different format, such as a list, table, or grid format, to name a few examples.

Yet another exemplary user interface focuses one a single merchant only. Such a user interface may be beneficial when there is a single, dominant merchant for a search query, for a set of search queries, or for a user. For example, an individual may search for "concert tickets in San Francisco." In response, a user interface having yet another different format may be provided that displays information regarding upcoming concerts in San Francisco and tickets offered by a single ticket vendor.

Yet another exemplary user interface includes more interactivity. For example, the user interface may include scrolling or paging mechanisms that enable an individual to scroll the advertisement to view additional information. In another example, the user interface may include search query refinement buttons that present search refinements and enable an individual to refine their initial or a previous search query. In yet another example, the user interface may include refinement buttons to search or sort information presented by the user interface, for example, by price or product features. Each of these different user interfaces represents a different format in which to present the search results.

In certain exemplary embodiments, rather than select from available user interfaces, the advertisement distribution system 120 generates the user interface dynamically. In such embodiments, the advertisement distribution system 120 may decide which of the available types of advertisement content to present to the recipient. For example, the advertisement distribution system 120 may determine to display certain content, such as an image, while determining not to display certain other content, such as product rating information. This determination may be based on the same information used to select from available user interfaces discussed above. Then, the advertisement distribution system creates a user interface having a format for presenting the desired information.

In block 220, a model or a set of rules for selecting a user interface for presenting advertisements to a recipient is generated. In one exemplary embodiment, a set of human defined rules are generated and stored in a rules engine of a user interface selector module 125 of the advertisement distribution system 120. The set of rules can include a multitude of criteria by which to select a user interface. A simple set of rules may analyze information regarding a single query received from an individual in determining which user interface to select. A more complex set of rules may include criteria for analyzing information regarding historical queries received from the individual, in combination with the received search query information. For example, the set of rules may consider how many related queries have been received from the individual. The set of rules also may consider which merchants, advertisers, or advertisements perform well or receive the highest amount of clicks for a specific query, for a category of query, for a specific chain of queries, for the individual, or for individuals having similar demographics as the individual. The set of rules also may consider information regarding multiple queries received from the user and/or which advertisements have previously been selected by the individual. Regardless of the specific set of rules, the object of the rules are to determine for what the individual is searching and to select a user interface that presents content that the individual is likely to select and in a manner that is relevant and contains the appropriate type of content for the user.

Figure 3:
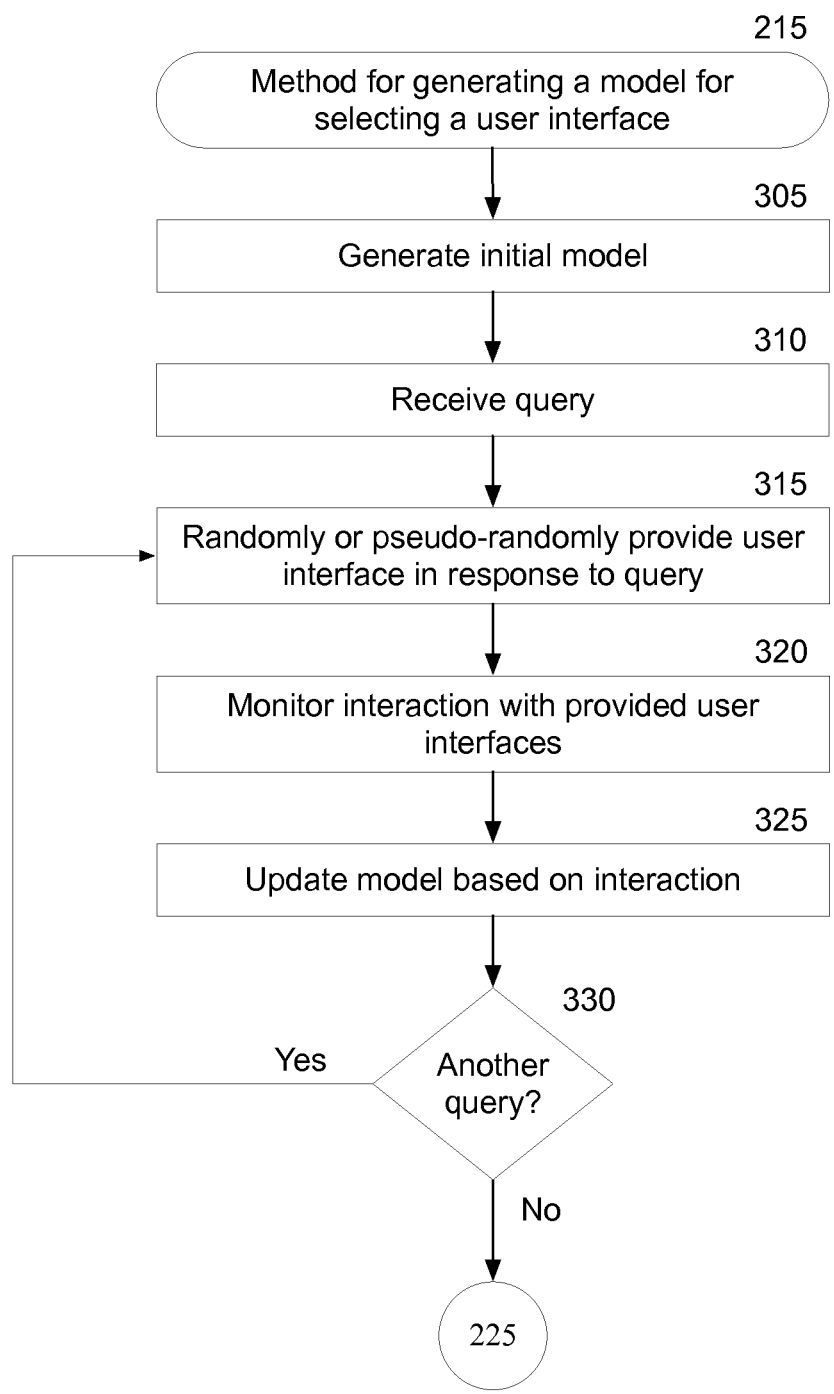
FIG. 3 is a block flow diagram depicting a method for generating a model for selecting a user interface, in accordance with certain exemplary embodiments.

In one exemplary embodiment, a model generator module 121 of the advertisement distribution system 120 generates a model for selecting a user interface from the user interface repository 129. The model can select a user interface based on certain criteria, such as one or more queries received from an individual, a category of each of the one or more queries, demographic information of the individual, advertisement conversion rates, predicted click through rates, other performance metrics, and/or other information. A set of machine learners can learn features that make different user interfaces effective under different situations. This model can provide a more complex and more scalable approach than using human defined rules. In certain exemplary embodiments, the model employs a logistic regression classifier that predicts or selects a user interface based on conversion rates. One exemplary method for generating a model for selecting a user interface is illustrated in FIG. 3 and discussed in more detail hereinafter.

In block 225, the information provider network device 110 receives a query or a request for an advertisement. In one embodiment, an individual, using the end user network device 155 enters a query into a web page displayed by the browser 160 and submits the search query. The submitted search query is transmitted to the information provider network device 110. In some implementations, selection of an ending date or some other input on the calendar 206, the graph 208, or elsewhere in the user interface 210 can result in the dismissal of the calendar 206 and the graph 208. For example, the user 204 can be navigated to next steps in planning a trip, e.g., using the dates that have been selected.

In one embodiment, an advertisement request is sent to the information provider network device 110. For example, another web site provider may display advertisements on web page documents delivered to individuals. If an individual accesses the web site, the provider may request advertisements to present to the individual. In such a request, the provider may transmit content of the web page document so that the information provider 110 can provide advertisements and a user interface for presenting the advertisements related to that content. Some web site providers allow individuals to register and hold accounts with the web site. An advertisement request sent from such a web site provider also may include information associated with the individual so that the information provider 110 can provide advertisements and a user interface for presenting the advertisements relevant to the individual. Of course, the individual may opt out of this feature or otherwise limit what information is sent to the information provider 110. In addition, the information can be transmitted anonymously without any information that would identify the individual. For example, the information associated with the user may include certain demographic information, such as age, gender, and location only. In addition or in the alternative, demographic information may be stored by the information provider 110 or inferred from other data. The request also may include other information for use in selecting advertisements and a user interface for presenting the advertisements, such as historical performance information obtained from prior advertisement selections for the individual, as well as information regarding a number and type of advertisements to select.

In block 230, an advertisement selector module 123 of the advertisement distribution system 120 selects one or more advertisements from the advertisement repository 127 based on information contained in the query or request for advertisements. In certain exemplary embodiments, the advertisement selector module 123 selects a desired number of advertisements having desired content based on the information contained in the query or request, demographic information, time and date information, performance information, and/or other information, such as brand affinity information for the individual, payment affinity information for the individual, or portal affinity information for the individual. For example, the advertisement selector module 123 may select a number of advertisements relevant to a query or request and having a product title, at least one image, and a product rating.

The advertisement selector module 123 also may select advertisements from the advertisement repository 127 based on bid information and advertisement or merchant performance information. Advertisement and merchant performance information can be stored in an advertisement index 137 maintained by the advertisement selector module 123. This performance information can reflect the performance of each advertisement when selected for each query, and/or for each category of query for sets or sequences of queries. In certain exemplary embodiments, the advertisement index 137 includes performance information specific to the individual associated with a query or advertisement request, including specific advertisement selection information and/ or historical interactions with previously-selected advertisements, such as click-throughs. In certain exemplary embodiments, the performance information also reflects performance of each advertisement when presented by each user interface stored in the user interface repository 129. Thus, the performance information can reflect a combination advertisement—user interface performance.

In block 235, a user interface selector module 125 of the advertisement distribution system 120 selects a user interface from the user interface repository 129 for presenting the selected advertisements. In certain exemplary embodiments, the user interface selector module 125 applies information contained in the query or request, information associated with the individual associated with the query or request, and/or other information to the model or set of rules generated in block 220 to select the user interface.

In certain exemplary embodiments, the user interface selector module 125 determines and classifies the task that the individual associated with the query or request is undertaking. To classify the task, the user interface selector module 125 can evaluate information contained in the query or request, information contained in multiple queries, and/or advertisements that the individual associated with the query or request has selected or otherwise interacted with. In certain exemplary embodiments, the user interface selector module 125 can evaluate information regarding how many related queries the individual has submitted and performance information for the user interfaces. The user interface selector module 125 may use information from a current query session only or a combination of current query session information with historical query and advertisement selection information.

User interface performance information can be stored in a user interface index 139 maintained by the user interface selector module 125. This performance information can reflect the performance of each user interface when selected for each query, and/or for each category of query, for sets or sequences of queries. In certain exemplary embodiments, the user interface index 139 includes performance information specific to the individual associated with a query or advertisement request, including specific user interface selection information and/or historical interactions with previously-selected user interfaces, such as click-throughs or mouse overs.

In certain exemplary embodiments, the user interface selector module 125 selects more than one user interface from the user interface repository 129. For example, the user interface selector module 125 may select one user interface for presenting a portion of the advertisements and a second user interface for presenting another portion of the advertisements. In another example, the user interface selector module 125 may select two user interfaces for presenting the same advertisement.

Although the user interface selector module 125 typically selects the user interface from the user interface repository 129 based in such a way to improve the rate of selection, the user interface selector module 125 also may present other user interfaces randomly or pseudo-randomly to gain performance information on those user interfaces. Information obtained through this process can be used to update the user interface index 139 and/or the model for selecting user interfaces. Other methods also can be used to obtain performance information regarding user interfaces. For example, a method that identifies combinations of user interfaces that have occurred infrequently or a method that uses a confidence value in predictions as an indicator of how much to explore previously unseen combinations also can be used in certain exemplary embodiments. Thus, the model can continuously learn and improve in performance.

In certain exemplary embodiments, the user interface selector module 125 can override selections made by the advertisement selector module 123. In one example, certain selected advertisements may not include the type of information required by the selected user interface. For instance, the user interface selector module 125 may reject an advertisement that does not include images if the selected user interface requires at least one image. The user interface selector module 125 also may re-order advertisements. In certain exemplary embodiments, the advertisement and user interface selections are performed by the same model/rules to capture interactions between user interfaces and products. Thus, the acts performed by the advertisement selector module 123 and the acts performed by the user interface module 125 can be performed by a single module.

In certain exemplary embodiments, the advertisements and the user interfaces are selected and evaluated as a unit. For example, when presenting information regarding electronics, a user interface that presents three advertisements may result in a higher clickthrough rate per advertisement than a user interface that presents five advertisements. This allows the predictions from the user interface model/rules and the predictions from the advertisement model/rules to be combined, for example to produce a composite score. The advertisement distribution system 120 can select the advertisements and user interface combination with higher performance, for example higher predicted click-through rate, or higher dollar value if bids are incorporated into the model.

In block 240, the information provider network device 110 transmits information regarding the selected advertisements and the selected user interface. If the advertisements and user interface(s) are selected in response to a search query, the information is sent to the end user network device 155. If the advertisements and user interface are selected in response to a request based on a search query, the information is sent to the entity that issued the request. Regardless of what entity to which the information is sent, the information regarding the advertisements includes information sufficient to allow the browser 160 to display the selected advertisements via the selected user interface.

If the advertisements are selected in response to a query, the information provider network 110 also transmits information regarding search results for the query. For example, the product catalog system 140 can select from content stored in the product catalog 145 based on the query, information regarding the individual that submitted the query, past queries received from the individual, and/or other information.

In block 245, the web browser 160 presents the advertisements via the user interface. The web browser 160 also presents the information from the product catalog 145 if the advertisements were selected in response to a search query. In certain exemplary embodiments, the user interface includes a template and the web browser 160 displays the template populated with information from the advertisements.

In certain exemplary embodiments, the advertisement distribution system 120 can adjust the type of content displayed by the web browser 160. For example, is a user selects or mouses over an advertisement displayed by a user interface including images only, the advertisement distribution system 120 may receive information from the web browser 160 indicating this interaction and update other user interfaces to display images.

Figure 4:
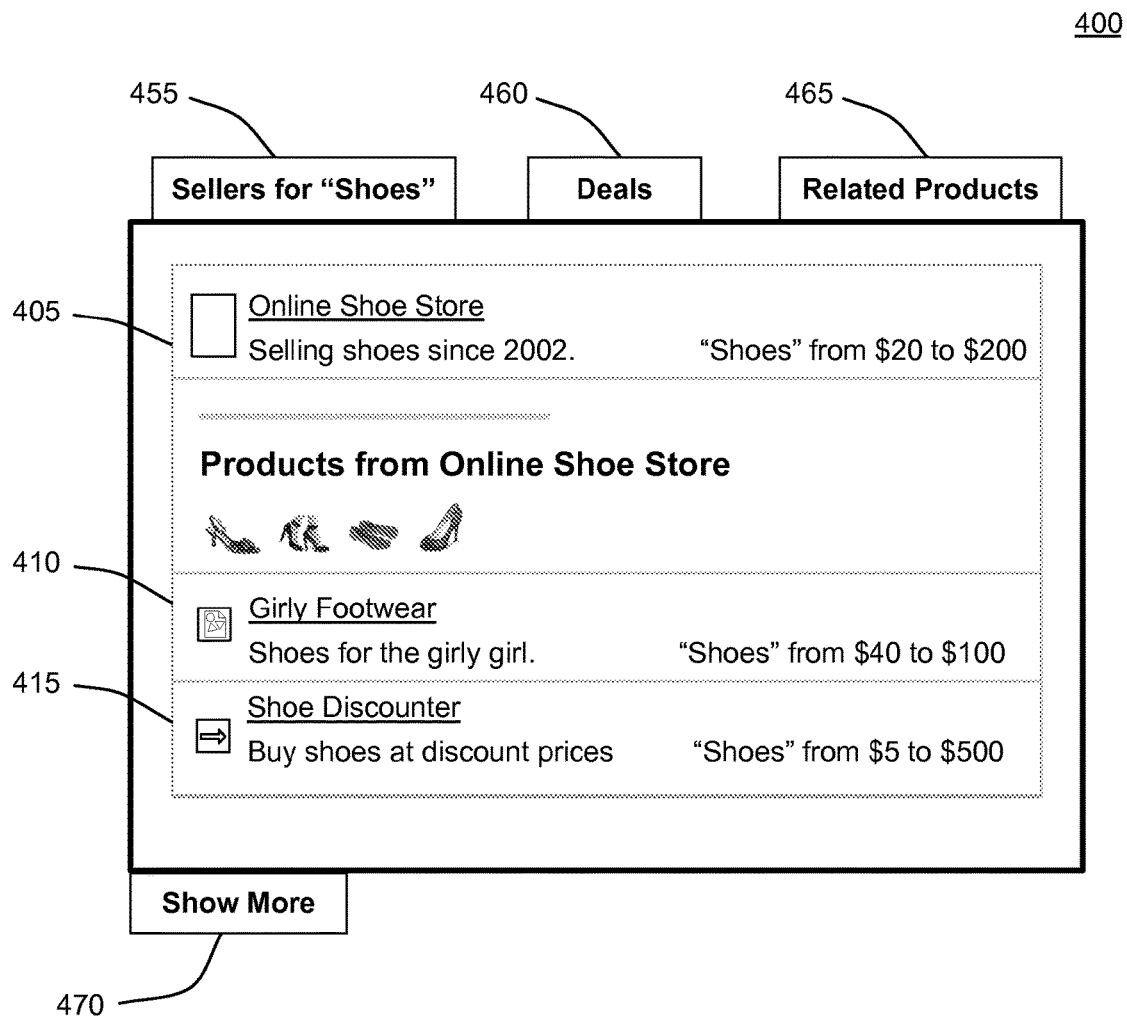
FIG. 4 depicts a user interface having advertisements, in accordance with certain exemplary embodiments.
Figure 5:
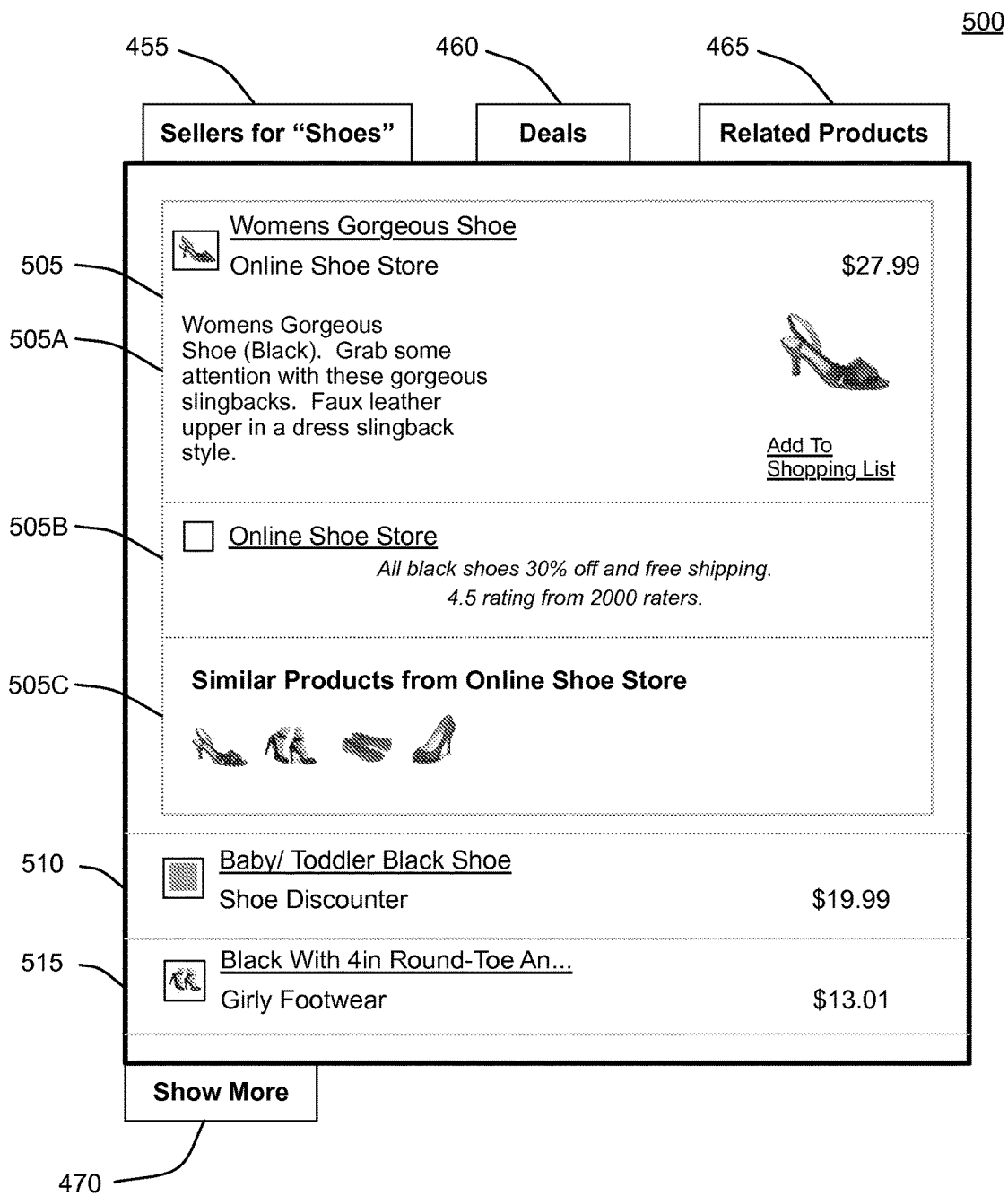
FIG. 5 depicts a user interface having advertisements, in accordance with certain exemplary embodiments.
Figure 6:
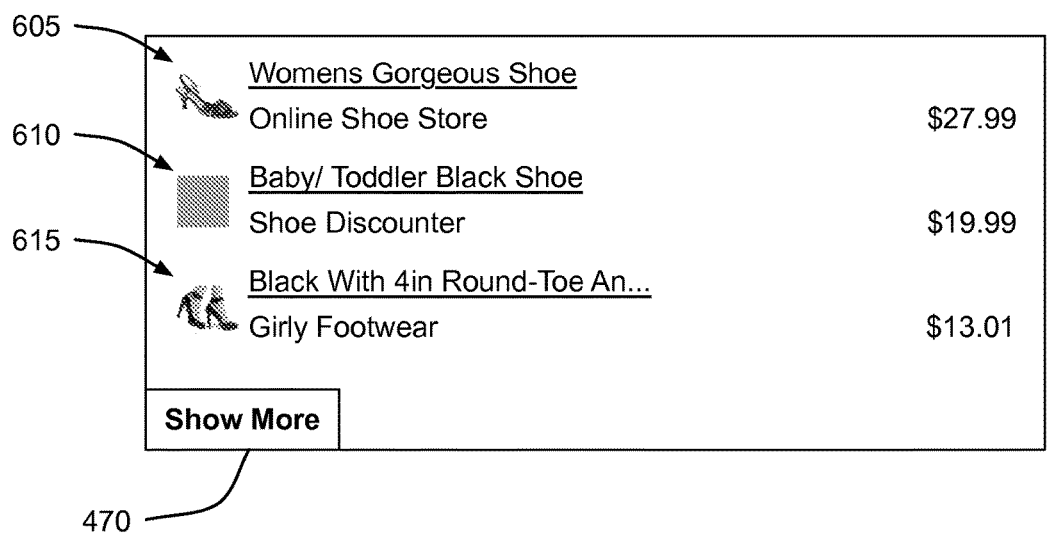
FIG. 6 depicts a user interface having advertisements, in accordance with certain exemplary embodiments.

FIGS. 4-6 depict several exemplary user interfaces 400-600 having advertisements that may be transmitted and to a user device 155 and populated with information regarding the advertisements in response to a query. In particular, the exemplary user interfaces 400-600 display advertisements that may be provided in response to a query for shoes.

Referring to FIG. 4, the exemplary user interface 400 includes advertisement 405 that displays merchant name "Online Shoe Store," a merchant description "Selling shoes since 2002," a price range, and images of products offered by the merchant. The user interface 400 also includes advertisements 410, 415 that also display a merchant name, merchant description, and price range, while not displaying any product images. Each of the advertisements 405-415 can be configured to navigate to a web site of the merchant if the user selects the advertisement 405-415, for example by clicking on the advertisement 405-415 using a mouse or other pointing device.

The exemplary user interface 400 also includes tabs 455-470 disposed along the perimeter. The tab 455 is configured to navigate to a web page document that displays a multitude of shoe sellers. The tab 460 is configured to navigate to a web page that displays promotional offers, discounts, or other deals on the product of interest, in this case shoes. The tab 465 is configured to navigate to a web page that displays information regarding related products. The tab 470 is configured to expand or to navigate to another web page that displays additional advertisements.

Referring to FIG. 5, the exemplary user interface 500 includes the same or similar tabs 455-470 as the user interface 400. The user interface 500 also includes several advertisements 505-525 that vary in the content displayed. In particular, the exemplary advertisement 505 is product oriented and includes sections 505A-505C. The section 505A includes a product name "Womens Gorgeous Shoe," a merchant name "Online Shoe Store," a product description, a price, a product image, and a link to add the product to a virtual shopping list; the section 505B includes the merchant name, "Online Shoe Store," a promotional message, and product review information; and the section 505C includes images of products offered by the merchant that are similar to the product displayed in section 505A. The exemplary advertisement 510 includes a product name "Baby/Toddler Black Shoe," a merchant name "Shoe Discounter," and a product price. Similarly, the advertisement 515 includes a product name "Black With 4in Round-Toe An . . . ," a merchant name "Girly Footwear," and a product price. Each of the advertisements 505-515 can be configured to navigate to a web site of the merchant if the user selects the advertisement 505-515, for example by clicking on the advertisement 505-515 using a mouse or other pointing device.

Referring to FIG. 6, the exemplary user interface 600 includes a "Show More" tab 470 and advertisements 605-615. Each of the advertisements 605-615 of the user interface 600 includes a product name, a merchant name, and a product price. As shown in FIGS. 4-6, advertisements (or other content) may be presented to individuals using varying user interfaces that display a variety of different information.

Although not shown in FIGS. 4-6, each of the user interfaces 400-600 also can include a "More like this" tab or icon proximal to each advertisement that, when selected, causes more advertisements having similar content or a similar display format. For example, if an individual desires advertisements that display additional products offered by a merchant, the individual may select a "More like this" icon displayed on the advertisement 4-5 of FIG. 4 or the advertisement 505 of FIG. 5.

Referring back to FIG. 2, in block 245, an interaction monitor module 124 of the advertisement distribution system 120 monitors the individual's interaction with the advertisements. In certain exemplary embodiments, when the individual interacts with one or more of the advertisements, such as by clicking on the display of an advertisement or mousing over an advertisement, the end user network device 155 transmits information regarding the interaction to the information provider network device 11 o. In certain exemplary embodiments, the interaction monitoring module 124 also monitors an amount of time an individual spends at an advertiser's web site after activating an advertisement or other information indicating the quantity of quality of interaction with an advertisement.

The interaction monitor module 124 also is capable of monitoring sequences of search queries. For example, an individual may search for a product in general terms and receive search results and advertisements directed to the general terms. If the individual does not receive any desirable search results, the individual may refine the search and receive a new set of search results and advertisements. The interaction update module 124 can store each query and any interactions with an advertisement or user interface resulting from either of the search queries. The interaction update module also can store information regarding a link that the individual selected in response to a search query. This information can then be used to update the model.

In block 250, depending on the type of interaction, the transmittal of information regarding an interaction may include a request for additional information from the advertiser, such as by following a link to a web page selected by the advertiser. For example, when an individual clicks on a displayed advertisement, the browser 160 may process HTML code that causes a new browser window to open with additional information relating to the request, such as a printable coupon, a display advertisement, or a selected page of the advertiser's web site. In certain exemplary embodiments, interacting with the advertisement can cause a change to an account of the individual with the advertiser, such as by adding an item to purchase to the individual's shopping cart of the advertiser's electronic commerce web site, or by applying a discount to one or more items in the individual's shopping cart.

In block 255, when the information provider network device 110 receives information regarding the interaction with the advertisements, the information provider network device 110 updates the advertisement index 137 or another storage device to indicate the interaction. For example, if an advertisement was activated or moused over, then the information provider network device 110 updates the advertisement index 137 to indicate this interaction. If multiple advertisements were presented and some of the advertisements 139 were not interacted with, then the information provider network device 110 updates the advertisement index to indicate this non-interaction. Likewise, the information provider network device 110 updates a user interface index 139 to indicate the interaction with the user interface that presented the advertisement. If multiple user interfaces were used to present advertisements and some of the user interfaces were not interacted with, then the information provider network device 110 updates the user interface index 139 to indicate this non-interaction. This information can be used for improving the subsequent selections of advertisements and user interfaces for presenting the advertisements, for determining a fee to be charged to the advertiser, or for other purposes. For example, the information can be used by the model generator 121 to update the model for selecting a user interface from the user interface repository 129.

In block 260, the information provider network device 110 conducts an inquiry to determine whether another query or request for advertisements is received. If the information provider network device 110 determines that another query or request is received, then the method 200 follows the "Yes" branch back to block 230 where another advertisement or group of advertisements are selected. Otherwise, the method 200 ends. Of course, the information provider network device 110 can continue to be available to receive additional queries or requests.

FIG. 3 is a block flow diagram depicting a method 300 for generating a model for selecting a user interface, in accordance with certain exemplary embodiments, as referenced in block 220 of FIG. 2. In block 305, the information provider network device 110 receives a query or request for an advertisement. In block 310, the advertisement selector module 123 selects advertisements to provide in response to the query or request. This block can be the same or similar to block 230 of FIG. 2.

In block 315, a model generator module 121 of the advertisement distribution system 120 interacts with the user interface selector module 125 to select a user interface for presenting the selected advertisements. In certain exemplary embodiments, the user interface is selected randomly or pseudo-randomly. In certain alternative embodiments, the user interface is selected from a list or table, and the model generator module 121 cycles through the user interfaces in the list or table such that each of the user interfaces are presented equally.

In block 320, the information provider network device 110 transmits information regarding the selected advertisements and selected user interface to the end user network device 155. The browser 160 presents the selected advertisements to the individual via the selected user interface.

In block 325, the interaction monitor module 124 monitors for interaction with the advertisements presented via the user interface, such as clicks or mouse overs. The interaction monitor module 124 updates the user interface index 139 in block 330 to reflect the interaction. These blocks can be the same or similar to blocks 245-255 of FIG. 2.

In block 335, the information provider network device 110 conducts an inquiry to determine whether another query or request for advertisements is received. If the information provider network device 110 determines that another query or request is received, then the method 220 follows the "Yes" branch back to block 310 where another advertisement or group of advertisements are selected. Otherwise, the method 220 proceeds to block 225 (FIG. 2).

Of course, the information provider network device 110 can continue to be available to receive additional queries or requests and generate the model. After the model is generated, the model can be placed into service and used to serve advertisements via the user interfaces, for example, using the method 200 illustrated in FIG. 2 and discussed above. The model can continuously learn from user interactions to better predict the user interface desired for specific queries, for specific sets of queries, and for specific individuals.

General

The exemplary methods and blocks described in the embodiments presented previously are illustrative, and, in alternative embodiments, certain blocks can be performed in a different order, in parallel with one another, omitted entirely, and/or combined between different exemplary methods, and/or certain additional blocks can be performed, without departing from the scope and spirit of the invention. Accordingly, such alternative embodiments are included in the invention described herein.

The invention can be used with computer hardware and software that performs the methods and processing functions described above. As will be appreciated by those having ordinary skill in the art, the systems, methods, and procedures described herein can be embodied in a programmable computer, computer executable software, or digital circuitry. The software can be stored on computer readable media. For example, computer readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays ("FPGA"), etc.

Although specific embodiments of the invention have been described above in detail, the description is merely for purposes of illustration. Various modifications of, and equivalent blocks corresponding to, the disclosed aspects of the exemplary embodiments, in addition to those described above, can be made by those having ordinary skill in the art without departing from the spirit and scope of the invention defined in the following claims, the scope of which is to be accorded the broadest interpretation so as to encompass such modifications and equivalent structures.

What is claimed is:

1. A system to render graphical user interfaces dynamically formatted based on search query type, comprising:
   a storage resource; and
   a processor communicatively coupled to the storage resource, wherein the processor executes application code instructions that are stored in the storage resource to cause the processor to:
      receive, from a user computing device associated with a user, a query comprising one or more search terms;
      select one or more search results responsive to the query;
      determine a type of the query based on the search terms;
      select, from two or more user interface formats, a first user interface format for presenting at least a portion of the selected one or more search results based on the determined type of the query, wherein each of the two or more user interface formats comprises a corresponding template for displaying specified content of the one or more search results;
      determine if each of the selected one or more search results correspond to the first user interface format selected; and
      transmit instructions causing the user computing device to render a graphical user interface having the selected first user interface format for presenting the one or more search results that correspond to the first user interface format selected;
      wherein selecting the first user interface format further comprises applying information contained in the query to a model, the model selecting which of the two or more user interface formats is more likely to receive selections based at least in part on the information contained in the query.

2. The system of claim 1, wherein the processor is further configured to execute application code instructions that are stored in the storage resource to cause the processor to:

transmit, to the user computing device, the selected one or more search results for presentation with one or more selected advertisements.

3. The system of claim 1, wherein the one or more search results comprise advertisements.

4. The system of claim 1, wherein the type of the query comprises a search for pricing information or promotional information.

5. The system of claim 1, wherein the type of the query comprises a general search.

6. The system of claim 1, wherein the type of the query comprises a search for images and product rating information.

7. The system of claim 1, wherein the instructions comprise information that enables an application to present the selected one or more search results via the selected first user interface format on the user computing device.

8. The system of claim 1, wherein selecting the first user interface format is further based on at least one of demographic information of the user and information regarding historical search queries submitted by the user.

9. The system of claim 1, wherein selecting the first user interface format further comprises applying information regarding a user associated with the query to the model, the model selecting which of the two or more user interface formats is more likely to receive selections based at least in part on the information regarding the user.

10. The system of claim 9, wherein the processor is further configured to execute application code instructions that are stored in the storage resource to cause the processor to:
receive information regarding an interaction with the selected one or more search results and the selected first user interface format; and
update the model using the information based on the interaction.

11. The system of claim 10, wherein the interaction comprises at least one of a selection of one of the one or more search results or an indication that the user hovered a cursor over one of the one or more search results via an interface of the user computing device.

12. The system of claim 1, wherein selecting the first user interface format further comprises applying information contained in the query and information regarding the user to a set of rules, the set of rules indicating which of the two or more user interface formats is more likely to receive a selection by the user via the user computing device.

13. A computer-implemented method to render graphical user interfaces dynamically formatted based on search query type, comprising:
by a content distribution computing system:
receiving, from a user computing device associated with a user, a query comprising one or more search terms;
selecting one or more search results responsive to the query;
determining, a type of the query based on the search terms;
selecting, from two or more user interface formats, a first user interface format from available formats based on the determined stage of the query, wherein each of the available formats comprises a corresponding template for displaying specified content of the one or more search results,
determining if each of the selected one or more search results correspond to the first user interface format selected; and
transmitting instructions causing the user computing device to render a graphical user interface having the selected first user interface format for presenting the one or more search results that correspond to the first user interface format selected;
wherein selecting the first user interface format further comprises applying information contained in the query to a model, the model selecting which of the two or more user interface formats is more likely to receive selections based at least in part on the information contained in the query.

14. The computer-implemented method of claim 13, further comprising, by the one or more computing devices, transmitting, to the user computing device, the selected one or more search results for presentation with one or more selected advertisements.

15. The computer-implemented method of claim 13, wherein selecting the first user interface format further comprises applying information regarding the user to the model, the model selecting which of the two or more user interface formats is more likely to receive selections based at least in part on the information regarding the user.

16. The computer-implemented method of claim 15, further comprising, by the content distribution computing system:
receiving information regarding an interaction with the selected one or more search results and the selected first user interface format; and
updating the model using the information based on the interaction.

17. The computer-implemented method of claim 16, wherein the interaction comprises at least one of a selection of one of the one or more search results or an indication that the user hovered a cursor over one of the one or more search results via an interface of the user computing device.

18. A computer program product to render graphical user interfaces dynamically formatted based on search terms included in search queries, comprising:
a non-transitory computer-readable medium having computer-readable program instructions embodied thereon that when executed by a computer cause the computer to:
receive, from a user computing device associated with a user, a query comprising one or more search terms;
select one or more search results responsive to the query;
determine a type of the query based on the search terms;
select, for presenting at least a portion of the selected one or more search results, a first user interface format from two or more user interface formats based on the determined type of the query, wherein each of the two or more user interface formats comprises a corresponding template for displaying specified content of the one or more search results;
determine if each of the selected one or more search results correspond to the first user interface format selected; and
transmit instructions causing the user computing device to render a graphical user interface having the selected first user interface format for presenting the one or more search results that correspond to the first user interface format selected,
wherein selecting the first user interface format further comprises applying information contained in the query to a model, the model selecting which of the two or more user interface formats is more likely to receive selections based at least in part on the information contained in the query.

19. The computer program product of claim 18, the non-transitory computer-readable medium further having computer-readable program instructions embodied thereon that when executed by a computer further cause the computer to transmit, to the user computing device, the selected one or more search results for presentation with one or more advertisements.

20. The computer program product of claim 18, wherein selecting the first user interface format further comprises applying information regarding the user associated with the query to the model, the model selecting which of the two or more user interface formats is more likely to receive selections based at least in part on the information regarding the user.

* * * * *